No. 618,293. Patented Jan. 24, 1899.
G. J. RIDLEY.
WATER FEEDING DEVICE FOR GRINDING WHEELS.
(Application filed May 26, 1898.)
(No Model.)

WITNESSES:
Edward Thorpe
H. L. Reynolds.

INVENTOR
G. J. Ridley.
BY
ATTORNEYS.

UNITED STATES PATENT OFFICE.

GEORGE J. RIDLEY, OF AUBURN, NEW YORK.

WATER-FEEDING DEVICE FOR GRINDING-WHEELS.

SPECIFICATION forming part of Letters Patent No. 618,293, dated January 24, 1899.

Application filed May 26, 1898. Serial No. 681,801. (No model.)

*To all whom it may concern:*

Be it known that I, GEORGE J. RIDLEY, of Auburn, in the county of Cayuga and State of New York, have invented a new and Improved Water-Feeding Device for Grinding-Wheels, of which the following is a full, clear, and exact description.

My invention relates to a device intended for supplying water to grinding-wheels, such as emery-wheels, while in operation, and thus to prevent the heating of tools ground upon said wheels.

My invention comprises the novel features hereinafter described and claimed.

Reference is to be had to the accompanying drawings, forming a part of this specification, in which similar characters of reference indicate corresponding parts in both views.

Figure 1:
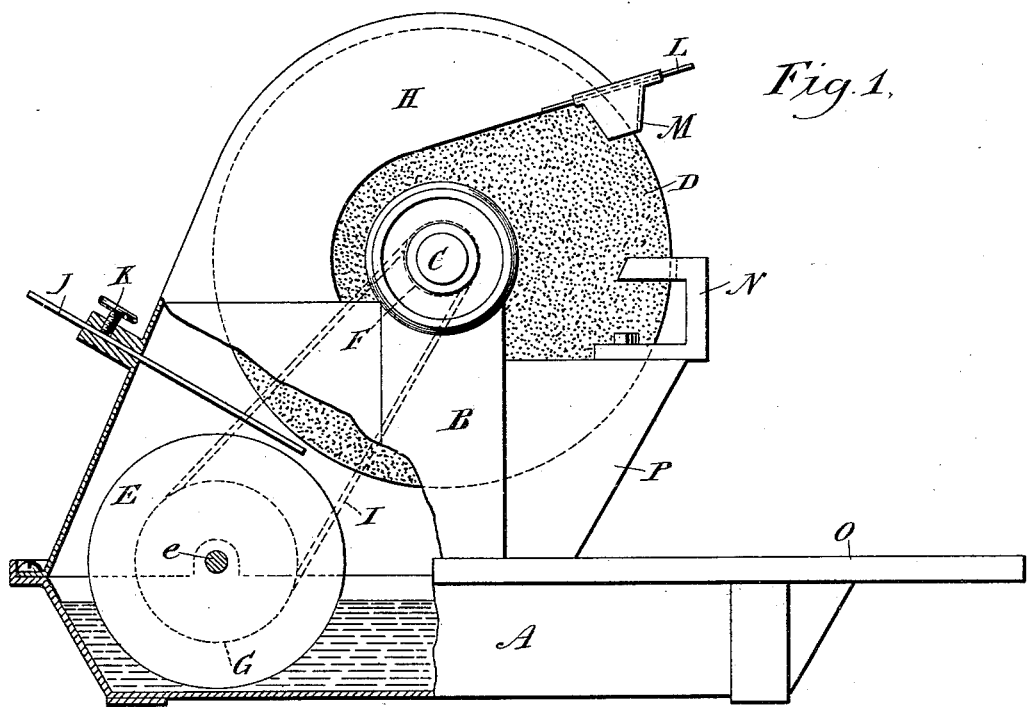
Figure 2:
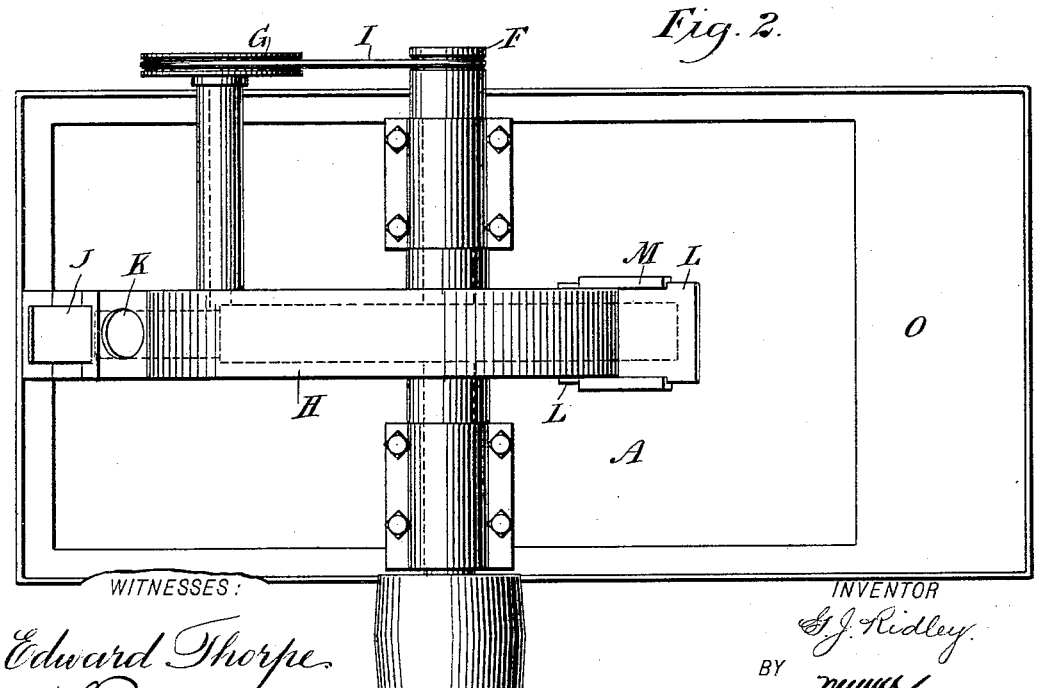

Figure 1 is a side elevation of my device, a portion of the casing being broken away to show the internal construction; and Fig. 2 is a top plan view of the same.

The drawings illustrate my device as applied to an emery-wheel. It is, however, understood that it may be applied in the same manner to any form of grinding-wheel.

The emery-wheel D is mounted upon a horizontal shaft C, supported in a frame B in any usual or desired manner. A shaft e is mounted in suitable bearings parallel with the shaft C, and upon this shaft e is mounted a wheel or disk E. Upon the same shaft is also mounted a pulley or band-wheel G, which is outside the casing and in line with a similar pulley or band-wheel F upon the shaft C of the emery-wheel. These two pulleys or band-wheels are connected by a band I, so that when the emery-wheel is rotated the disk E will be rotated. The disk E is in line with the emery-wheel D, but not in contact therewith. Its lower portion dips into the water in a reservoir A, which is preferably located beneath the emery-wheel D.

The emery-wheel is covered by a hood H, which prevents water from being thrown about. This hood or casing extends down so as to cover the disk E. A portion P, lying beneath the working side of the emery-wheel, serves to carry any water which is discharged from the wheel back to the reservoir. Upon this portion P is mounted a tool-support N, upon which the tool may be conveniently rested while being ground. A slide J is mounted within suitable guides so that it may be inserted more or less between the emery-wheel and the feed-disk E. This slide is held in place by a set-screw K or other suitable means.

When the emery-wheel D is revolved, the disk E is also revolved and the water which adheres to the surface of the disk is lifted from the reservoir and thrown off by centrifugal force. A portion of the water so discharged will, unless intercepted, strike the emery-wheel. This water will wet both the side and rim of the wheel sufficiently to prevent the tools being ground thereon from becoming overheated. The amount of water supplied to the emery-wheel is regulated by the slide J, which is moved in or out, as desired. When moved inward, it cuts off a portion of the water and decreases the amount supplied to the wheel D.

The reservoir A is surrounded by an apron O, having a slightly-raised flange about its edge, insuring the return into the reservoir of any water which escapes from the emery-wheel. The hood H is cut away upon the working side of the emery-wheel in the manner common to such hoods, so that a portion of the wheel is accessible to the tools. This hood is provided with a flange L, upon which is mounted a slide M, forming a water-guard.

In this device the water-feed wheel is not in contact with the grinding-wheel, but is rotated thereby, the result being that the grinding-wheel is not wet except when in use and that the rotative connection between the two wheels is not disturbed by uneven wear of the grinding-wheel. The speed of the feed-wheel may also be reduced to a point where its operation will be better than if it were in direct contact with the grinding-wheel. Where the feed-wheel is in direct contact with the grinding-wheel, its speed of rotation is so great that the water is all thrown off immediately it leaves the tank.

Having thus described my invention, I claim as new and desire to secure by Letters Patent—

1. A grinding device, comprising an abrading-wheel, a water-feed wheel in line with the abrading-wheel but not in contact therewith, a water-reservoir within which the feed-wheel dips, and rotative connection between the two wheels.

2. A grinding device, comprising an abrading-wheel and a water-feed wheel in line but not in contact, a rotative connection between the two wheels, a water-reservoir within which the feed-wheel dips, and a slide interposed between the feed-wheel and the abrading-wheel, by which the amount of water may be regulated.

3. A grinding device, comprising an abrading-wheel and a water-feed wheel in line but not in contact, rotative connection between the two wheels, a water-reservoir within which the feed-wheel dips, a hood covering most of the abrading-wheel, and a slide mounted on the hood above the grinding-point of the latter wheel and movable toward and from the wheel.

GEORGE J. RIDLEY.

Witnesses:
A. H. SEARING,
CLARA G. BENNETT.